(12) United States Patent
Yi et al.

(10) Patent No.: US 11,002,959 B2
(45) Date of Patent: May 11, 2021

(54) HEAD MOUNT DISPLAY DEVICE AND DRIVING METHOD THEREOF

(71) Applicant: SAMSUNG DISPLAY CO., LTD., Yongin-si (KR)

(72) Inventors: Yongwoo Yi, Hwaseong-si (KR); Hyosun Kim, Seongnam-si (KR); Young-Jun Seo, Suwon-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 31 days.

(21) Appl. No.: 16/250,423

(22) Filed: Jan. 17, 2019

(65) Prior Publication Data

US 2019/0243131 A1    Aug. 8, 2019

(30) Foreign Application Priority Data

Feb. 2, 2018  (KR) .......................... 10-2018-0013626

(51) Int. Cl.
*G02B 27/00*  (2006.01)
*G02B 27/01*  (2006.01)
*G09G 3/20*   (2006.01)
*G06F 3/01*   (2006.01)

(52) U.S. Cl.
CPC ..... *G02B 27/0093* (2013.01); *G02B 27/0172* (2013.01); *G09G 3/20* (2013.01); *G06F 3/012* (2013.01); *G09G 2310/0278* (2013.01); *G09G 2310/08* (2013.01); *G09G 2380/00* (2013.01)

(58) Field of Classification Search
CPC ... G02B 27/0093; G02B 27/0172; G09G 3/20
USPC ............ 345/8, 212, 506, 690, 691; 709/207
See application file for complete search history.

(56) References Cited

U.S. PATENT DOCUMENTS

| 5,841,439 | A  | * | 11/1998 | Pose ..................... G06T 15/005 345/418 |
| 6,157,396 | A  | * | 12/2000 | Margulis .................. G06T 1/20 345/506 |
| 9,625,721 | B2 | * | 4/2017  | Nepveu ............... G02B 27/017 |
| 9,645,395 | B2 |   | 5/2017  | Bolas et al. |
| 9,824,498 | B2 | * | 11/2017 | Mallinson .............. G02B 26/10 |
| 2004/0190092 | A1 | * | 9/2004 | Silverbrook ....... H04N 1/00376 358/539 |
| 2006/0026253 | A1 | * | 2/2006 | Kessen ................ G06Q 10/107 709/207 |

(Continued)

FOREIGN PATENT DOCUMENTS

| KR | 1020160048881 | 5/2016 |
| KR | 1020160061026 | 5/2016 |
| KR | 1020170004816 | 1/2017 |

*Primary Examiner* — Prabodh M Dharia
(74) *Attorney, Agent, or Firm* — F. Chau & Associates, LLC

(57) ABSTRACT

A head mount display device includes a display device and a processor. The display device includes an image compensator, a data driver, a scan driver, a timing controller, and a display panel. The image compensator receives an image data corresponding to a user's field of view and motion information, calculates a scaling value that controls a size of a masking area that controls a range of the user's field of view by masking a peripheral portion of an image corresponding to the image data based on the motion information, and generates compensation image data based on the image data and the scaling value.

22 Claims, 7 Drawing Sheets

(56) References Cited

U.S. PATENT DOCUMENTS

| | | | |
|---|---|---|---|
| 2011/0216056 A1* | 9/2011 | Yoo ..................... | G09G 3/3233 |
| | | | 345/212 |
| 2014/0111564 A1* | 4/2014 | Jeon ..................... | G09G 3/3648 |
| | | | 345/691 |
| 2016/0026253 A1* | 1/2016 | Bradski ................ | H04N 13/344 |
| | | | 345/8 |
| 2016/0189642 A1* | 6/2016 | Shin ..................... | G09G 3/3655 |
| | | | 345/690 |
| 2019/0056498 A1* | 2/2019 | Sonn ..................... | G01S 7/4865 |
| 2019/0172410 A1* | 6/2019 | Okumura ................ | G06F 3/147 |
| 2019/0208127 A1* | 7/2019 | Murakami ........... | G02B 27/646 |

* cited by examiner

HEAD MOUNT DISPLAY DEVICE AND DRIVING METHOD THEREOF

CROSS-REFERENCE TO RELATED APPLICATION(S)

This application claims priority under 35 USC § 119 to Korean Patent Application No. 10-2018-0013626, filed on Feb. 2, 2018 in the Korean Intellectual Property Office (KIPO), the contents of which are incorporated herein by reference in its entirety.

BACKGROUND

1. Technical Field

Example embodiments relate generally to a head mount display (HMD) device and a driving method thereof, and more particularly, to reducing user discomfort due to motion sickness when using an HMD.

2. Discussion of the Related Art

A head mount display (HMD) device is a digital device worn on a user's head, and which displays video or multimedia contents. For instance, an HMD device may be in the form of glasses or a mask-like device. Various HMD devices such as virtual reality HMDs have recently become popular, consistent with the trend towards wearable electronics as the sizes and weight of digital devices have decreased. However, an HMD device may sometimes cause a user to experience motion sickness due to a mismatch between visual information provided to the user's eyes and vestibular information provided to the user's vestibular system. Such motion sickness may include symptoms such as dizziness, nausea, confusion, ataxia, blurred vision, tunnel vision and/or vertigo.

SUMMARY

Example embodiments provide a head mount display device and a driving method thereof, capable of decreasing user discomfort caused by video viewing.

In an illustrative embodiment, a head mount display (HMD) device may include at least one processor including an image compensator configured to receive an image data corresponding to a user's field of view and motion information, calculate a scaling value that controls a size of a masking area that controls a range of the user's field of view by masking an edge of an image corresponding to the image data based on the motion information, and generate a compensation image data based on the image data and the scaling value. A data driver may generate a data signal based on the compensation image data. A scan driver may generate a scan signal, and a tinting controller may generate control signals that control the data driver and the scan driver. A display panel may display a compensation image corresponding to the compensating image data based on the data signal and the scan signal.

In example embodiments:

The motion information may include a head rotation speed of the user and a translation speed of the user.

The size of the masking area may increase as the head rotation speed and the translation speed increase.

The size of the masking area may be less than a predetermined threshold size.

The head mount display device may further include a sensing device configured to sense the user's motion.

The head mount display device may further include a changing amount calculator configured to store the image data frame by frame and calculate the motion information based on a changing amount of the image data between frames.

The masking area may extend towards a center of the image from a periphery of the image.

The masking area may mask the image in a rectangular or circular shape.

The image compensator may include a first calculator configured to calculate a control coefficient based on the head rotation speed and the moving speed, a second calculator configured to calculate the scaling value based on the control coefficient, and a compensation image generator configured to generate the compensation image data based on the scaling value.

The control coefficient may increase as the head rotation speed and the moving speed increase.

The scaling value may decrease as the control coefficient increases.

When the control coefficient is equal to or greater than a predetermined minimum scaling value, the second calculator may output the minimum scaling value as the scaling value.

An illustrative embodiment of a driving method of a head mount display device may include: generating motion information by sensing a user's motion; receiving the motion information and an image data corresponding to a user's field of view calculating a control coefficient based on the motion information and the image data; calculating a scaling value that controls a size of a masking area that controls a range of the user's field of view by masking a peripheral portion of an image corresponding to the image data based on the control coefficient, and generating a compensation image data based on the image data and the scaling value.

In another illustrative embodiment, an HMD device includes: at least one processor including an image compensator configured to receive image data representing a full size image and to receive motion information including at least one of head rotation speed and a translation speed of a user wearing the HMD device. The image compensator generates compensation image data with a peripheral portion of the full size image masked by an amount positively correlated with the at least one of the head rotation speed and the translation speed. A display panel is configured to display the compensation image based on the compensation image data. The HMD device may further comprise a sensor unit to sense at least one of the head rotation speed and the translation speed, where the image data represents a computer-generated environment, and the processor causes the image data to change according to the motion information.

Therefore, a head mount display device and driving method thereof according to the inventive concept may decrease a size of a viewable image by controlling the size of the masking area that masks a peripheral portion of the image, where the masking is based on the user's motion. Thus, motion sickness otherwise felt by the user may be prevented. Further, a user's concentration may be improved in certain situations by the masking the periphery of the image. Further still, the head mount display device and the driving method thereof may improve latency that occurs when the image signal compensated in the processor is provided to the display device by generating the compensating image signal in the display device. Power consumption may also be reduced by masking the edge of the image corresponding to the image data based on the user's motion.

BRIEF DESCRIPTION OF THE DRAWINGS

Illustrative, non-limiting example embodiments will be more clearly understood from the following detailed description taken in conjunction with the accompanying drawings, in which like reference characters denote like elements or features, wherein.

DETAILED DESCRIPTION OF EMBODIMENTS

Hereinafter, embodiments of the present inventive concept will be explained in detail with reference to the accompanying drawings.

Figure 1:
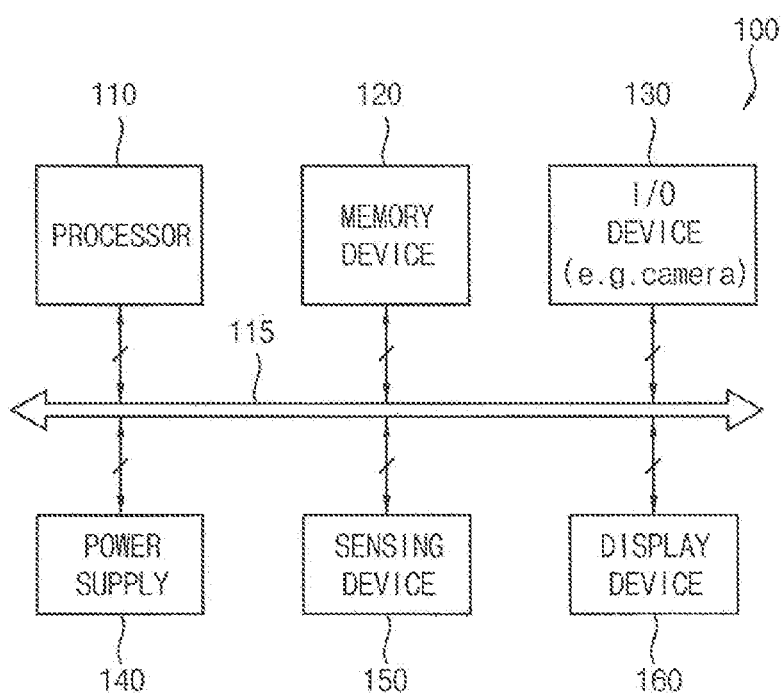
FIG. 1 is a block diagram illustrating a head mount display device according to example embodiments.

FIG. 1 is a block diagram illustrating a head mount display (HMD) device, 100, according to example embodiments. HMD device 100 may include a processor 110, a memory device 120, an input/output (I/O) device 130, a power supply 140, a sensing device 150, and a display device 160. In other examples, HMD display 100 may include additional or fewer components than those illustrated.

In an embodiment, HMD device 100 is a virtual reality (VR) or simulation device that displays computer generated images to the user and tracks user head movement coinciding with movement of HMD device 100. In some examples, motion sensors are included within HMD device 100 to sense user head movement. The user head movement may act as commands that change a simulated position in a virtual environment represented by the computer-generated images, allowing the user to feel that be or she is traveling in the virtual environment. In other examples, HMD 100 is used in conjunction with at least one hand-held device such as mouse or joystick, where movement of the hand-held device additionally or alternatively causes changes in the simulated environment. In still other examples, HMD 100 operates in a non-VR mode but displays two dimensional (2D) or three dimensional (3D) video. In any of these cases, as described further below HMD device 100 may be configured to prevent or reduce user motion sickness by detecting a speed of the user's head rotation and/or translation, and correspondingly masking a peripheral portion of a viewable screen. In the case of device-movement induced VR, a fast rotation/translation speed may result in commands that cause the images to change rapidly, resulting in motion sickness when the image is viewed at a full screen size. By reducing the view area in this situation, motion sickness may be prevented or reduced. For a non-VR application, a detection of fast head rotation and/or translation may predict that the user is experiencing motion sickness such as dizziness. Since the motion sickness in this case may also be due to rapid motion in the video (whether or not caused by user commands), HMD device 100 may similarly alleviate the ill-effects of the fast moving video by masking a peripheral portion of the view screen.

The processor 110 may perform various calculations and tasks and may control overall operations of the head mount display device 100. Processor 110 may provide information or functions to a user by processing a signal, data information input through the input/output (I/O) device 130 or driving an application program stored in the memory device 120. In some example embodiments, the processor 110 may be a microprocessor, a central processing unit (CPU), an application processor (AP), a communication processor (CP), etc. Processor 110 may be coupled to other components via a bus 115, e.g. an address bus, a control bus, a data bus, etc. Further, the processor 110 may be coupled to an extended bus such as a peripheral component interconnect (PCI) bus.

The memory device 120 may store data for operation of the head mount display device 100. The memory device 120 may store a plurality of application programs driven in the head mount display device 100, data for operating the head mount display device 100, commands, etc. At least of the application programs may be downloaded from an external server through the input/output (I/O) device 130. For example, the memory device 120 may include at least one non-volatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a magnetic random access memory (MRAM) device, a ferroelectric random access memory (FRAM) device, etc, and/or at least one volatile memory device such as a dynamic random access memory (DRAM) device, a static random access memory (SRAM) device, a mobile DRAM device, etc.

The input/output (I/O) device 130 may be at least one input device such as a camera or an image input section for inputting the image signal; a microphone or an audio input for inputting an audio signal; a user input section (e.g., a touch key, a push key, a joystick, a wheel key, etc.) for receiving a user input; and/or at least one output device such as an audio output section, a haptic module, a light output section, etc. for generating an output signal related to a sense of sight, hearing and/or touch. In some embodiments, the display device 160 may be included in the input/output (I/O) device 130.

The power supply 140 may provide power for operation of the head mount display device 100. The power supply 140 may receive external power and/or internal power and provide the power to each of the components included in the head mount display device 100. For example, the power supply 140 may be (or may include) an embedded battery or replaceable battery.

The sensing device 150 may include at least one sensor for sensing environment information, user information, etc. For example, the sensing device 150 may include a speed sensor, an acceleration sensor, a gravity sensor, an illuminance sensor, a motion sensor, a fingerprint scan sensor, a light sensor, an ultrasonic sensor, a heat sensor, etc.

The display device 160 may communicate with other components via bus 115 or other communication links. The display device 160 may display information processed in the head mount display device 100. The head mount display device 100 may be worn and operated on a user's head. As mentioned earlier, the user may experience motion sickness while using an HMD because visual information provided to the user's eyes and vestibular information provided to a vestibular organ are mismatched. To solve this problem, the display device 160 of the head mount display device 100 according to embodiments may decrease an overall movement of an image viewed by the user by controlling a size of a masking area that masks a peripheral portion of the image based on motion information of the user. Thus, the ill-feeling due to motion sickness may be prevented or alleviated. Hereinafter, the display device 160 will be described in detail referring to FIG. 3.

Figure 2:
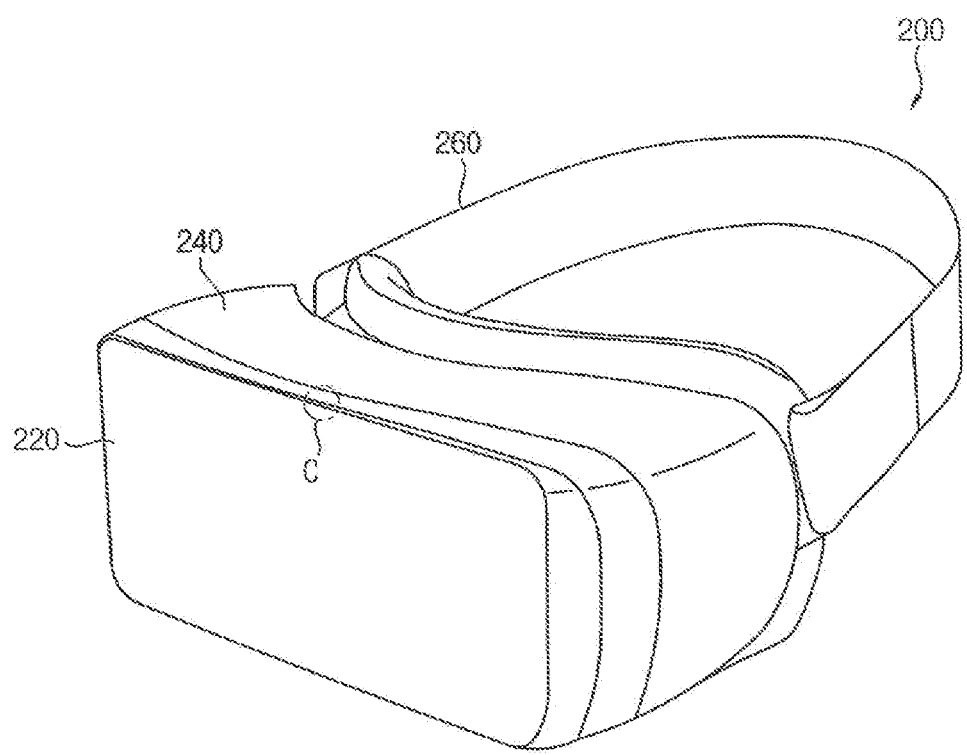
FIG. 2 is a perspective view illustrating an example configuration of the head mount display device of FIG. 1.

FIG. 2 is a perspective view illustrating a head mount display device, 200, which is an embodiment of the HMD device 100 of FIG. 1. HMD device 200 may include a display device 220, a housing 240, and a mounting part 260. The display device 220 of FIG. 2 may correspond to the display device 160 of FIG. 1. HMD device 200 is configured to be worn on a user's head and to provide image information to the user. The display device 220 may display an image based on an image signal. In a stereoscopic embodiment, the display device 220 may provide left-eye images to the user's left eye and right-eye images to the user's right eye to thereby display three dimensional (3D) images stereoscopically. A stereoscopic embodiment may also generate two dimensional (2D) images by displaying the same images for the left-eye image and the right eye image. In an embodiment that is just 2D-capable, a single image may be output instead of left-eye and right-eye images. Accordingly, HMD device 200 may provide, in various embodiments, a 2D image, a 3D image, a virtual reality image, and/or a 360-degree panorama image to the display device 220.

Examples of display device 220 include a liquid crystal display (LCD) device and an organic light emitting display (OLED) device, either of which may be a flexible display device. The display device 220 may be included in the housing 240 or be combined with (e.g., integral with) the housing 240. The display device 220 may receive a command (e.g., data, power, etc.) though an interface included in the housing 240.

The housing 240 may be configured, when worn by the user, to be predominantly in front of the user's eyes. The housing 240 may include composition elements for driving the head mount display device 200. In an exemplary embodiment, the housing 240 of the HMD device 200 may include a wireless communication device or a wired/wireless interface. The wireless communication device may wirelessly receive the image signal from an external device. In some examples, the wireless communication device may communicate with the external device by various communication methods such as Bluetooth, Radio Frequency Identification ("RFID"), Infrared Data Association ("IrDA"), ZigBee, Near Field Communication ("NFC"), Wireless-Fidelity ("Wi-Fi"), Ultra Wideband ("UWB"), etc. The interface may couple HMD device 200 to the external device. For example, the interface of HMD device 200 may include a wire/wireless headset port, an external charging port, a wire/wireless data port, a memory card port, a port for connecting a device that includes a user identification module, an audio input/output (I/O) port, a video input/output (I/O) port, and/or an earphone port. A camera (one example of I/O device 130) may be mounted on the housing 240, e.g. in area C on a front portion of HMD device 200. In some applications, images captured by the camera may be displayed by display device 220, with or without superimposed augmented reality objects.

The mounting part 260 may be coupled to the housing 240. The head mount display device 200 may be mounted on the user's head by the mounting part 260. For example, the mounting part 260 may be implemented as a belt or an elastic band.

Figure 3:
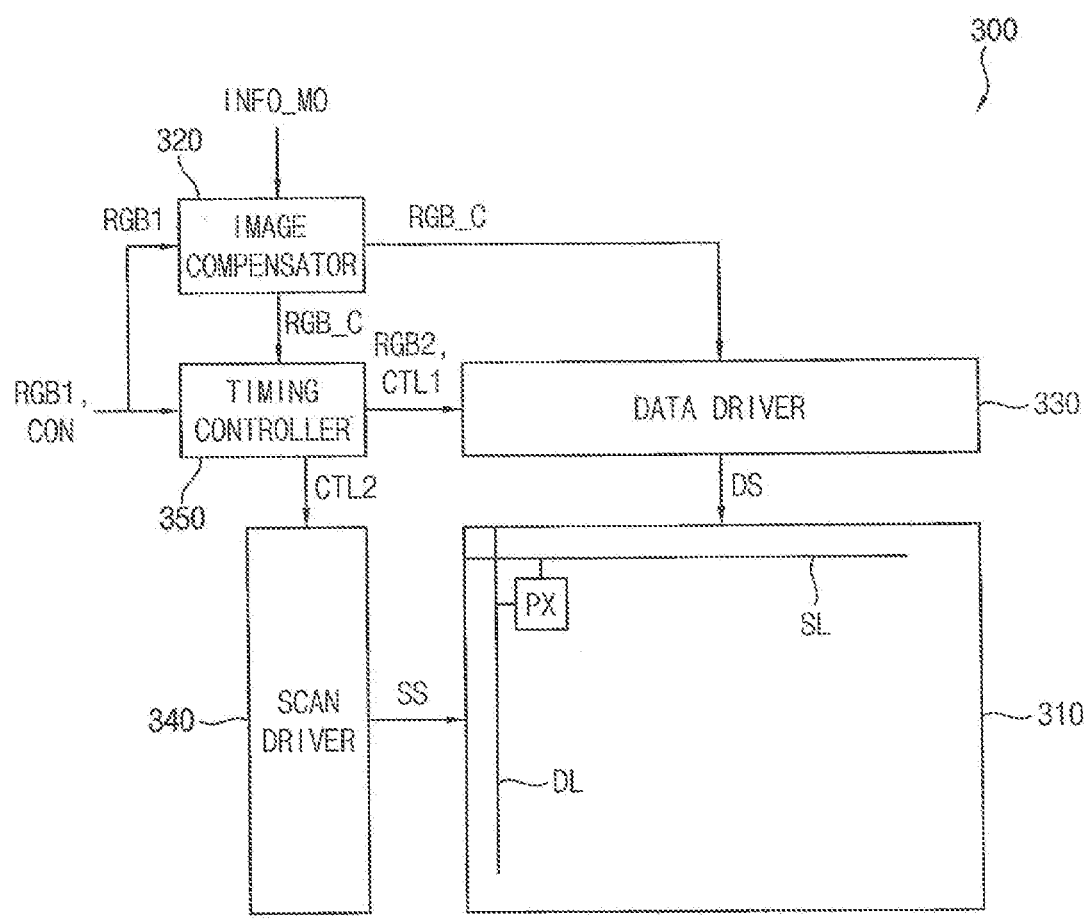
FIG. 3 is a block diagram illustrating a display device included in the head mount display device of FIG. 1.
Figure 4A:
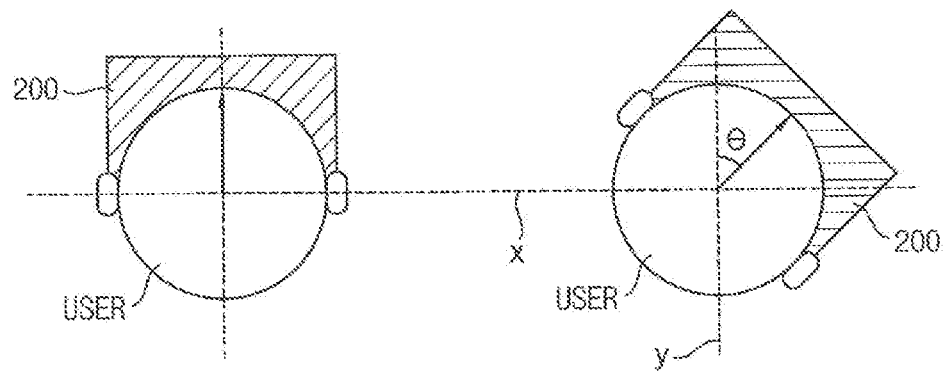
FIGS. 4A and 4B are diagrams illustrating rotation and displacement, respectively, of an HMD device, for describing operations of the display device of FIG. 3.
Figure 4B:
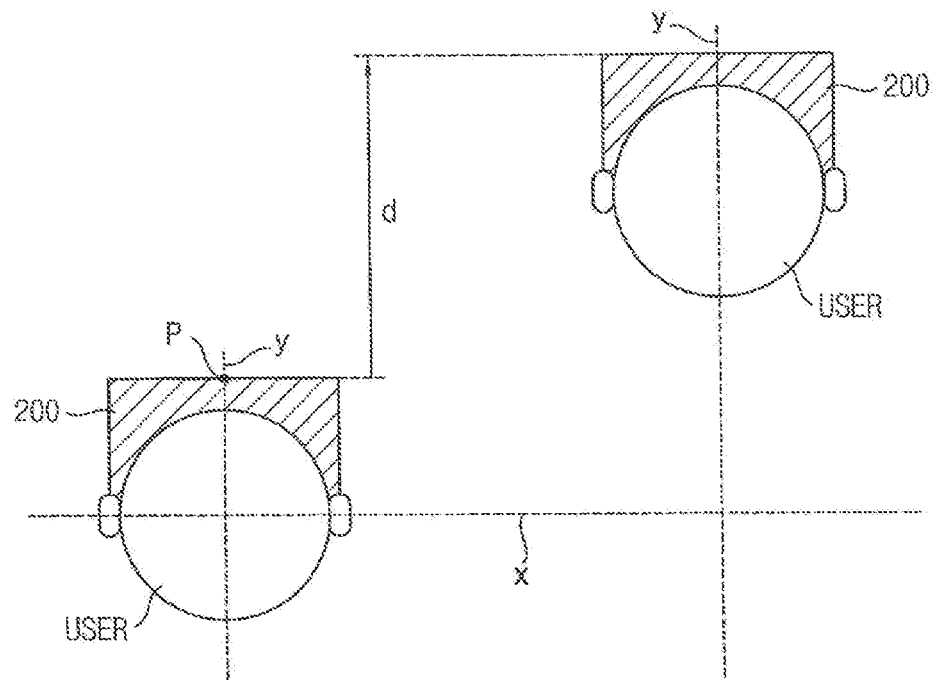

FIG. 3 is a block diagram illustrating example a display device 300, which is an example of display devices 160 and 220 of FIGS. 1 and 2. FIGS. 4A and 4B are diagrams illustrating rotation and displacement, respectively, of an HMD device, for describing operations of the display device 300.

Referring to FIG. 3, display device 300 may include a display panel 310, an image compensator 320, a data driver 330, a scan driver 340, and a timing controller 350. The display panel 310 may include a plurality of data lines DL, a plurality of scan lines SL, and a plurality of pixels PX in a grid layout (only one pixel PX is shown in FIG. 3). For example, each of the pixels PX included in the display panel 310 may include a thin film transistor (TFT) electrically coupled to a data line DL and a scan line SL, a liquid crystal capacitor and a storage capacitor coupled to the thin film transistor when the display device 300 is a liquid crystal display device. When the display device 300 is embodied as an organic LED device, each of the pixels PX included in the display panel 310 may include a thin film transistor electrically coupled to a data line DL and a scan line SL, a storage capacitor coupled to the thin film transistor, a driving transistor (i.e., the thin film transistor) coupled to the storage capacitor, and an organic light emitting element coupled to the driving transistor. The display panel 310 may display an image based on a data signal DS provided through the data lines DL and a scan signal SS provided through the scan lines SL. Here, the image displayed on the display panel 310 may be a compensation image corresponding to a compensation image data RGB_C generated in the image compensator 320.

The image compensator 320 may receive a first image data RGB1 corresponding to user's field of view and motion information INFO_MO, calculate a scaling value that controls a size of a masking area that controls a range of the user's field of view by masking a peripheral portion of the image corresponding to the first image data RGB1 based on the motion information INFO_MO, and generate a compensation image data RGB_C based on the first image data RGB1 and the scaling value. The image compensator 320 may receive the first image data RGB1 and the user's motion information INFO_MO. The first image data RGB1 may correspond to the user's field of view. For example, the image compensator 320 may receive an image captured by a camera (one example of I/O device 130) installed e.g. in area C of FIG. 2 on the front of HMD device 200 as at least part of the first image data RGB1. In one embodiment, the image captured by the camera may be augmented by augmented reality (AR) objects transmitted to HMD device 200 from an external source, or rendered by a processor reading AR information from memory within HMD device 200. In another embodiment, the image captured by the camera is displayed in a separate window while another window displays computer generated images.

Referring to FIGS. 4A and 4B, the user's motion information INFO_MO may include a head rotation speed of the user and a moving speed of the user. Hereafter, movement other than rotational movement will be referred to as translation or translational movement. The user who wears HMD device 200 (including display device 300) may rotate his or her head at an angle θ about an origin in a defined coordinate system. The coordinate system may be a 2D or 3D coordinate system that may be predefined based on dimensions of the HMD housing 240 and mounting part 260. A 2D coordinate system may have x and y axes, as shown, with an origin at an approximate center point of the user's head. In the 3D case, the rotation angle may be a function of pitch, yaw and roll with respect to an origin of three orthogonal axes. (Note that if mounting part 260 is adjustable, sensors or switch contacts may be used to determine an adjustment position and more accurately define the coordinate system according to the size of the user's head.) Further, the user wearing the head mount display device may move a translation distance d from a predefined reference point (e.g., point P). In FIG. 4B, the distance d is shown as a translation distance representing forward or backward movement of the user. That is, d is defined as a translation component along the y axis that runs approximately between and parallel to the user's eyes. In other examples, d may be defined as a translation distance that has distance components along two or three axes.

In some embodiments, the image compensator 320 may receive the user's motion information INFO_MO from a sensing unit. For example, a velocity sensor or an acceleration sensor included in the sensing unit may sense a rotation speed of user's head and a translation movement speed of the user (hereafter, just translation speed, interchangeably) and provide the rotation and translation speeds to the image compensator 320 as the motion information INFO_MO. Alternatively, a location sensor included in the sensing device may calculate the rotation and translation speeds based on location information of the head mount display device HMD worn on the user's head, and provide the rotation and translation speeds to the image compensator 320 as the motion information INFO_MO. In other embodiments, the image compensator 320 may receive the motion information INFO_MO from a "changing amount calculator", which may be coupled to (or may be part of) the image compensator 320. When the image data is data captured by camera 130, image elements in the captured image (e.g. of a stationary scene) move along the visual display area from frame to frame. Such image movement is correlated with user rotation/translation of his her head while wearing the HMD device 200. In this scenario, the changing amount calculator may store the first image data frame by frame and calculate the motion information INFO_MO based on a changing amount of the first image data RGB1 between frames. For example, the changing amount calculator may calculate the changing amount by comparing the first image data RGB1 of an (N–1)th frame and the first image data RGB1 of a (N)th frame and calculate the head rotation and translation speeds based on the changing amount. For instance, motion vectors between image elements of the adjacent frames may be determined to arrive at an overall changing amount between the two frames. In addition, if camera 130 is embodied as a stereoscopic camera, depth information of image elements in an environment may be obtained using epipolar triangulation. The use of depth information may allow for more accurate rotation and translation calculations using visual odometry.

Figure 7:
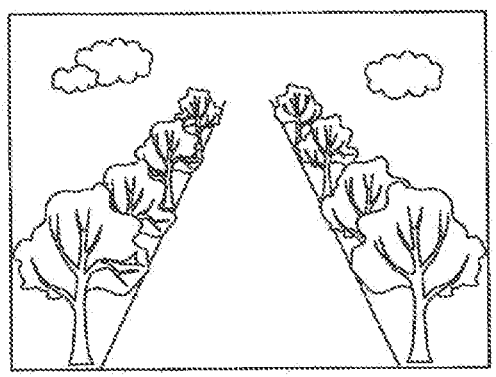
FIGS. 7 and 8 are diagrams illustrating respective operations of a compensation image generator included in the image compensator of FIG. 5.
Figure 7:
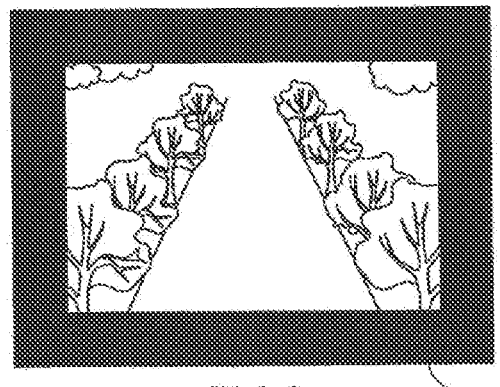
Figure 8:
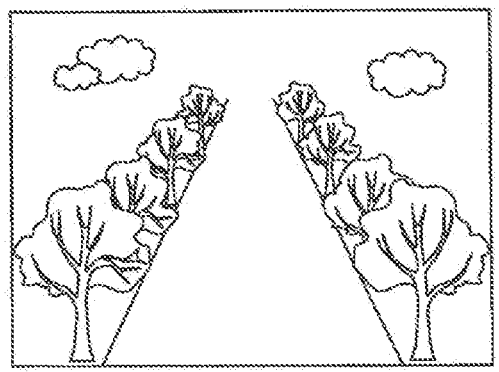
Figure 8:
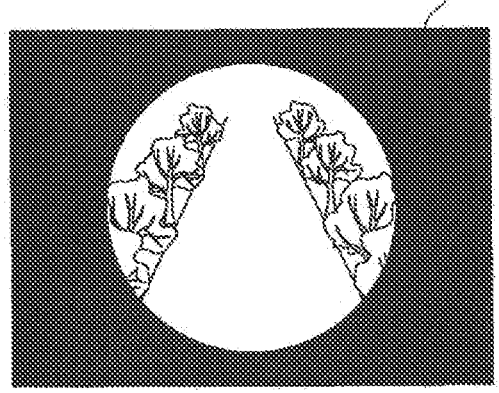

The image compensator 320 may control the size of the masking area that masks a peripheral portion of the image corresponding to the first image data RGB1 based on the determined rotation speed and translation speed. The image compensator 320 may determine the size of the masking area based on a first weight value for the head rotation speed and a second weight value for the translation speed. Here, the first and second weights may be determined by a user setting and/or calibration. For instance, during an initial calibration and setting process, HMD device 100 may output test videos to the user in which image elements move at different respective speeds, representing different rotation and translation movements, and the user may provide input selections to select speeds at which discomfort begins. The image compensator 320 may increase the size of the masking area as the head rotation speed and the translation speed increase. That is, the image compensator 320 may increase the size of a peripheral annular portion of the image being masked, thereby reducing a central viewing area, as the user's motion increases. The user may thereby concentrate on the image in the central region of the display panel 310 in this situation. In some embodiments, the masking area may mask the image in a rectangular shape (as shown in FIG. 7). In other embodiments, the masking area may mask the image in a circular shape (as shown in FIG. 8). When the size of the masking area determined based on the user's motion exceeds a predetermined threshold size, the image compensator 320 may set the size of the masking area at the threshold size. That is, the size of the masking area may be always be less than or equal to the threshold size, whether or not any significant rotation and/or translation is detected.

The image compensator 320 may calculate a scaling value that controls the size of the masking area, and generate the compensation image data RGB_C based on the first image data RGB1 and the scaling value. The image compensator 320 may provide the compensation image data RGB_C to the timing controller 350 or the data driver 330. As described above, the image compensator 320 may control the size of the masking area that masks the image corresponding to the first image data RGB1 from a peripheral edge based on the user's motion. Thus, the image motion may have a reduced effect on the user, and the user may concentrate on the image displayed on the center of the display panel 310. It is noted here that the compensation image data RGB_C may differ from the first image data by including gray codes for displaying a single color such as black or alternatively a blurred image in the masking region as a substitute for the original image data RGB1 in that region. On the other hand, the image data RGB_C for the central (unmasked) region may be the same as the first image data RGB1. Hence the amount of motion occurring in the central region may be the same as that of the first image data RGB1.

The data driver 330 may generate the data signal DS based on the compensation image data RGB_C. Alternatively, the data driver 330 may generate the data signal DS based on second image data RGB2 provided from the timing controller 350, where timing controller 350 may derive the second image data RGB2 from the compensation image data RGB_C output by image compensator 320. The data driver 330 may output the data signal DS to the data lines DL of the display panel 310 in response to a first control signal CTL1 provided from the timing controller 350. Here, the first control signal CTL1 may include a horizontal start signal and a first clock signal.

The scan driver 340 may generate the scan signal SS and provide the scan signal SS sequentially to the scan lines SL of the display panel 310 in response to a second control signal CTL2 provided from the timing controller 350. Here, the second control signal CTL2 may include a vertical start signal and a second clock signal.

The timing controller 350 may receive the first image data RGB1 and a control signal CON from an external device and receive the compensation image data RGB_C from the image compensator 320. The timing controller 350 may output the second image data RGB2 by selectively performing a display quality compensation, an adaptive color correction (ACC), and/or a dynamic capacitance compensation DCC, etc. to the first image data RGB1 or the compensation image data RGB_C. Alternatively, the timing controller 350 may provide the first image data RGB1 (when a full screen image is displayed) or the compensation image data RGB_C (when masking is applied) without modification to the data driver 330. The control signal CON may include a horizontal synchronization signal, a vertical synchronization signal, and a reference clock signal. The timing controller 350 may generate the horizontal start signal using the horizontal synchronization signal. The timing controller 350 may generate the vertical start signal using the vertical synchronization signal and may generate a first clock signal and a second clock signal using the reference clock signal. The timing controller 350 may provide the horizontal start signal and the first clock signal to the data driver 330 as the first control signal CTL1. The timing controller 350 may provide the vertical start signal and the second clock signal to the scan driver 340 as the second control signal CTL2. It is noted here that while the image compensator 320 is illustrated coupled to the timing controller 350 is in FIG. 3, the image compensator 320 may alternatively be included in the timing controller 350.

As described above, the display device 300 included in the head mount display device may control the size of the masking area that reduces the user's field of view by masking a peripheral portion of the image corresponding to the first image data RGB1, on the basis of the user's motion. Thus, the image motion may have a lesser effect on the user, and the user may concentrate on the image displayed on the center of the display panel 310. Therefore, a sick feeling such as dizziness or nausea may be prevented or reduced in severity.

Figure 5:
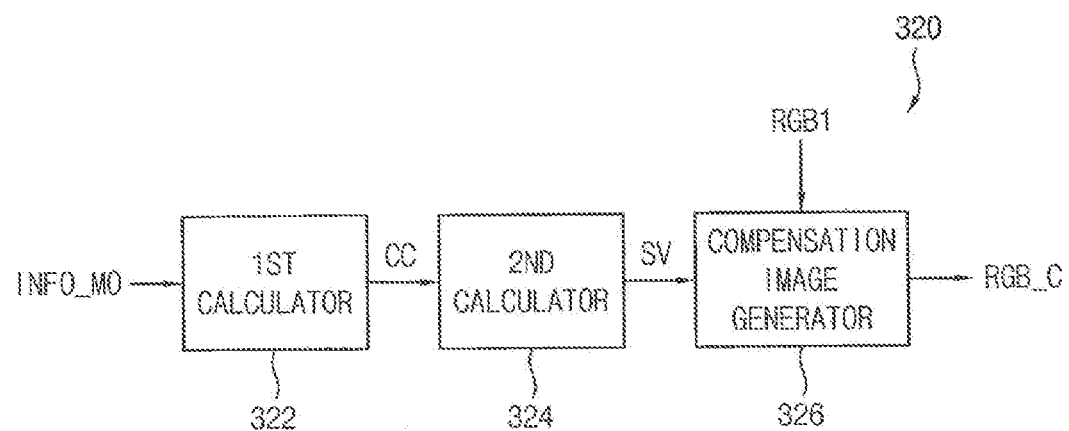
FIG. 5 is a block diagram illustrating an image compensator included in the head mount display device of FIG. 1.
Figure 6:
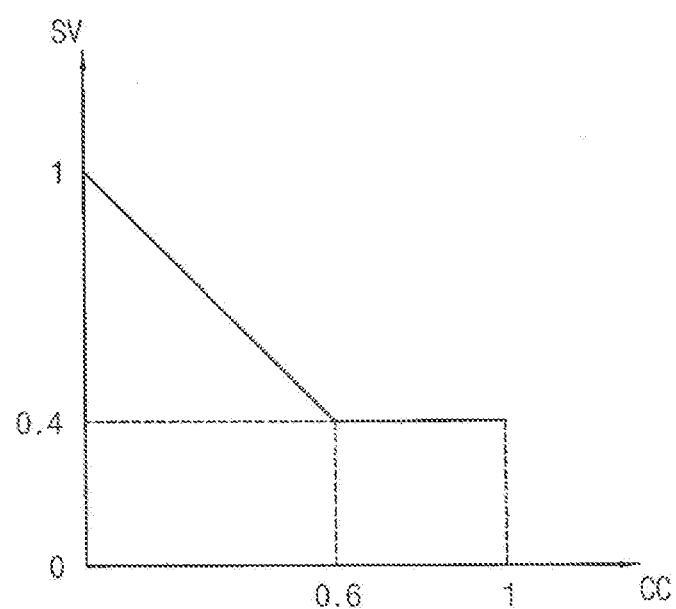
FIG. 6 is a graph illustrating for describing a first calculator and a second calculator included in the image compensator of FIG. 5.

FIG. 5 is a block diagram illustrating an example image compensator included in the head mount display device of FIG. 1. FIG. 6 is a graph illustrating for describing a first calculator and a second calculator included in the image compensator of FIG. 5. FIGS. 7 and 8 are diagrams for describing a compensation image generator included in the image compensator of FIG. 5.

Referring to FIG. 5, the image compensator 320 may include a first calculator 322, a second calculator 324, and a compensation image generator 326.

The first calculator 322 may calculate a control coefficient CC based on the motion information INFO_M. The motion information INFO_M may include the head rotation speed and the moving speed. The control coefficient CC may be a variable representing the size of the masking area that masks the peripheral portion of the image. For instance, when a full size of the image corresponding to the image data is set at reference value of 1.0, the control coefficient CC that represents the size of the masking area may be less than 1.0. The first calculator 322 may calculate the control coefficient CC based on equation 1 as follows.

$$CC=(w1 \times RV)+(w2 \times MV) \qquad \text{<EQUATION1>}$$

Here, w1 represents a first weight value, RV is the head rotation speed, w2 represents a second weight value, and MV is the translation movement speed.

The first and second weight values w1, w2 may be determined by a user setting. The user may customize the amount or masking and/or the situations in which masking is to occur by setting the first and second weight values w1 and w2 based on the user's head rotation and head movement, respectively. For instance, a user may be prompted to input a command or perform a test to set a typical and/or maximum head rotation and movement. If a hand-operated peripheral device such as a mouse, joystick, or keyboard is used with the HMD device 100, the user may set mouse rotation, etc. The user may set the second weight value based on head translation, mouse translation, etc. For example, when the user feels motion sickness in a rotation motion more than a translation motion, the first weight value may be greater than the second weight value. As described above, the first calculator 322 may receive the motion information INFO_MO (i.e., the head rotation speed and the translation speed) from the sensing device. For example, the sensing device may measure the head rotation speed and the moving speed using a velocity sensor. Alternatively, the sensing device may measure a head rotation angle and a rotation time using an angle sensor and calculate the head rotation speed based on these measurements. Further, the sensing device may calculate translation speed based on measurements of a translation distance and a translation time. The first calculator 322 may calculate the control coefficient CC based on the predetermined first and second weight values, the head rotation speed and the translation speed provided from the sensing device. The control coefficient CC may increase as the head rotation speed and translation speed increase. That is, the size of the masking area may increase as the head rotation and translation speed increase. The first calculator 322 may provide the control coefficient CC to the second calculator 324.

The second calculator 324 may calculate the scaling value SV based on the control coefficient. The scaling value SV may be a constant that represents the size of the display area except for the masking area. The second calculator 324 may calculate the scaling value SV according to the range of the control coefficient CC.

The second calculator 324 may calculate the scaling value SV when the control coefficient CC, is less than a predetermined threshold value, using equation 2 as follows:

$$SV=1-CC \qquad \text{<EQUATION2>}$$

where CC is the control coefficient. The scaling value SV may decrease as the control coefficient CC increases when the control coefficient CC is less than the predetermined threshold value. That is, the size of the display area that displays the image may decrease as the size of the masking area increases.

The second calculator 324 may calculate the scaling value SV using an equation 3 when the control coefficient CC is equal to or greater than the predetermined threshold value.

$$SV=1-THV \qquad \text{<EQUATION3>}$$

where THV is the predetermined threshold value. Although the control coefficient CC increases, the scaling value SV may be uniformly maintained when the coefficient CC is equal to or greater than the predetermined threshold value. That is, the second calculator 324 may limit the size of the masking area.

Referring to FIG. 6, the scaling value SV may decrease when the control coefficient CC is less than the threshold value, and the scaling value SV may be uniformly maintained when the control coefficient CC is equal to or greater than the threshold value. For example, in case that the threshold value is 0.6 and the control coefficient CC is less than 0.6, the second calculator 324 may generate the scaling value SV which decreases as the control coefficient CC increases. If the threshold value is 0.6 and control coefficient CC is equal to or greater than 0.6, the second calculator 324 may generate the scaling value SV which is 0.4 although the control coefficient CC increases. That is, although the control coefficient CC that represents the size of the masking area increases as the head rotation speed and the translation speed are increased, the second calculator 324 may limit the size of the masking area by not decreasing the scaling value SV any more when the control coefficient CC is equal to or greater than the threshold value.

The compensation image generator 326 may generate the compensation image data RGB_C based on the first image data RGB1 and the scaling value SV. The compensation image generator 326 may generate the compensation image data RGB_C that includes the masking area based on the scaling value SV. When the entire size of the image corresponding to the first image data RGB1 is 1, the compensation image generator 326 may display the image at a size corresponding to the scaling value SV having a decimal value in the central region of the display panel and mask the remaining area of the image.

Referring to FIG. 7, when the full size of the image corresponding to the first image data RGB1 is 1 and the scaling value SV is 1, the compensation image generator 326 may generate the compensation image data RGB_C of which the size of the display area DA is 1 and the size of the masking area MA is 0. That is, the compensation image generator 326 may generate the first image data RGB1 as the compensation image data RGB_C as is, and the image corresponding to the compensation image data RGB_C may be displayed on the display panel.

On the other hand, when the full size of the image corresponding to the first image data RGB1 is 1 and the scaling value SV is 0.6, the compensation image generator 326 may generate the compensation image data RGB_C of which the size of the display area DA is 0.6 and the size of the masking area MA is 0.4. The size of the masking area MA may increase from the edge to the center of the display panel as the scaling value SV decreases. Here, the size of the masking area MA may extend less than the threshold size because the second calculator 324 equally maintains the scaling value SV when the control coefficient CC is equal to or greater than the threshold value.

The compensation image generator 326 may mask the image displayed on the display panel in a rectangular shape as depicted in FIG. 7. Here, a blurring process may be performed on a boundary line of the masking area MA and the display area DA so that the user may naturally recognize the boundary line.

The compensation image generator 326 may mask the image displayed on the display panel in a circular shape as described in FIG. 8. Although the masking area MA having the rectangular shape and the circular shape is described in FIGS. 7 and 8, the shape of the masking area MA is not limited thereto. For example, the masking area MA may have a polygonal shape.

As described above, the image compensator 320 may calculate the control coefficient CC based on the motion information INFO_MO of the user, calculate the scaling value SV based on the control coefficient CC, and generate the compensation image data RGB_C based on the scaling value SV. Operations of the image compensator 320 may result in a decrease in motion sickness with which the user would otherwise experience, by generating the compensation image data RGB_C that masks the edge of the display panel according to the motion (i.e., the head rotation speed and the translation speed) of the user.

Figure 9:
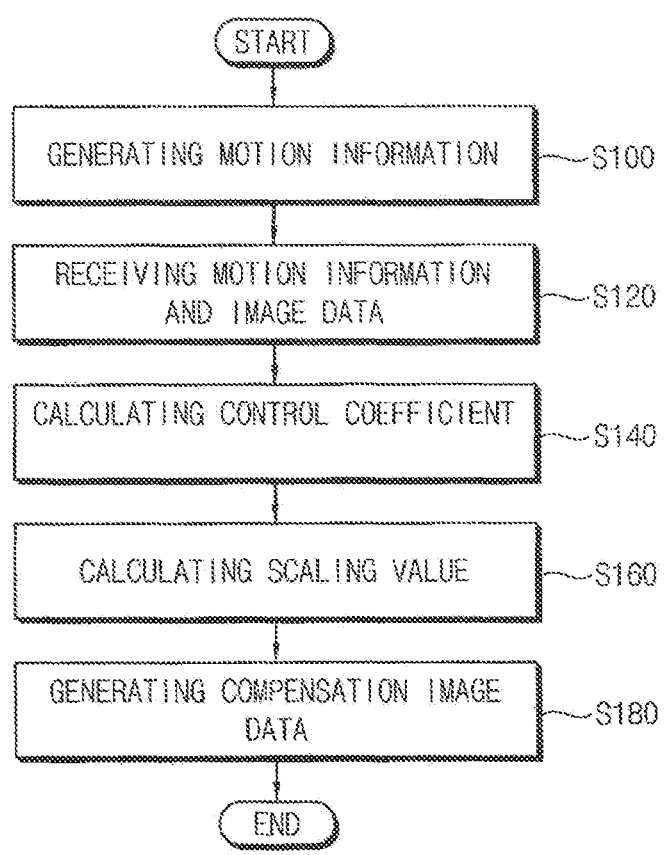
FIG. 9 is a flowchart illustrating a driving method of a head mount display device according to example embodiments.

FIG. 9 is a flowchart illustrating a driving method of a head mount display device according to example embodiments. The method may include a step S100 of generating motion information by detecting a user's motion, and a step S120 of receiving the motion information and image data corresponding to a user's field of view. A control coefficient may be calculated (S140) based on the motion information and the image data. A scaling value may be calculated (S160), which controls the user's field of view by masking a peripheral portion of the image corresponding to the image data based on the control coefficient. The compensation image data is generated based on the image data and the scaling value.

As just described, the driving method of the head mount display device may generate the motion information by detecting (S100) the user's motion. The motion information may include a head rotation speed and a translation speed of the user. In some example embodiments, a sensing unit may detect the motion of the user and generate the motion information. For example, a speed sensor and/or an acceleration sensor included in the sensing unit may sense a rotation speed of user's head and/or a translation speed of the user and provide the rotation and/or translation speeds to the image compensator as the motion information. Alternatively, a location sensor included in the sensing device may calculate the rotation speed of user's head and the translation speed of the user based on location information of the HMD device worn on user's head and provide the rotation and translation speeds to the image compensator as the motion information. In other embodiments, the display device of the head mount display device may generate the motion information. The display device may store the image data corresponding to the user's field of view frame by frame, and calculate the motion information of the user based on a changing amount of the image data between frames. In one example of the display device generating the motion information, the display device uses image information captured by the camera as discussed earlier. In another example, the display device does not consider the user's actual head motion but instead considers the change in motion of the displayed video itself. If the image motion is too rapid for the particular user, e.g., as determined by predetermined settings for that user, HMD device 100 may implement the masking operations when the image motion exceeds a threshold.

The driving method of the head mount display device may receive the motion information and the image data corresponding to the user's field of view S120. The display device of the head mount display device may receive the image data and the motion information provided from the sensing unit. Alternatively, the display device of the head mount display device may receive the image data and calculate the motion information based on the image data.

The driving method of the head mount display device may calculate the control coefficient based on the motion information and the image data S140. The control coefficient may be a constant that represents a size of a masking area that masks the image corresponding to the image data. The display device of the head mount display device may calculate the control coefficient by respectively multiplying weight values by the head rotation speed and the moving speed and adding two values. The display device of the head mount display device may calculate the control coefficient using the equation 1.

The driving method of the head mount display device may calculate the scaling value that controls the size of the masking area that masks the image corresponding to the image data from the periphery of the display panel based on the control coefficient S160. The scaling value may be a constant that represents the size of the rest display area except the masking area. The display device of the head mount display device may calculate the sealing value according to a range of the control coefficient. The display device of the head mount display device may calculate the scaling value using the equation 2 when the control coefficient is less than the predetermined threshold value. Here, the scaling value may decrease as the control coefficient increases. That is, the size of the masking area may increase as the head rotation speed and the translation speed, and the size of the display area on which the image is displayed may decrease as the size of the masking area increases. The display device of the head mount display device may calculate the scaling value using the equation 3 when the control coefficient is equal to or greater than the predetermined threshold value. Here, although the control coefficient increases, the scaling value may be uniformly maintained. That is, although the head rotation speed and the translation speed increase, the masking area may be less than the predetermined threshold size.

The driving method of the head mount display device may generate the compensation image data based on the image data and the scaling value S180. The display device of the head mount display device may generate the compensation image data that includes the masking area based on the scaling value. In some embodiments, the display device of the head mount display device may generate the compensation image data that masks the edge of the image in a rectangular shape. In other embodiments, the display device of the head mount display device may generate the compensation image data that masks the edge of the image in a circular shape. The masking area may extend from the periphery towards the center of the image as the scaling value decreases.

As described above, the driving method of the head mount display device of FIG. 9 may calculate the control coefficient based on the motion information of the user, calculate the scaling value based on the control coefficient, and generate the compensation image data based on the scaling value. The driving method of the head mount display device may decrease motion sickness that may be otherwise felt by the user, by generating the compensation image data that masks the peripheral portion of the display panel according to the user's motion (e.g., the head rotation speed and the translation speed).

Any one of the above-described elements for manipulating, generating and/or processing data and signals, such as any of the above-described image compensator, timing controller, scan driver, data driver, first calculator, second calculator, and compensation image generator may be composed of electronic circuitry such as a special purpose hardware circuit or processor or a general purpose processor that executes instructions read from a memory to run a routine to carry out the element's function. Various ones of the above described elements may be embodied as part of the same processor, which executes instructions at different stages to carry out the functions of the components sequentially, or using parallel processing. With the use of parallel processing, various ones of the components may be embodied as respective processing elements of a parallel processor. Alternatively, the various elements may be embodied as part of a plurality of different processors. For example, with such a composition based on hardware circuitry the above-discussed image compensator, timing controller, scan driver, data driver, first calculator, second calculator, and compensation image generator may alternatively be called, respectively, an image compensator circuit, a timing controller circuit, a scan driver circuit, a data driver circuit, a first calculator circuit, a second calculator circuit, and a compensation image generator circuit, circuitry, processing element, processor, computational hardware or the like.

Exemplary embodiments of the inventive concept have been described herein with reference to signal arrows, block diagrams and algorithmic expressions. Each block of the block diagrams, and combinations of blocks in the block diagrams, and operations according to the algorithmic expressions can be implemented by hardware accompanied by computer program instructions. Such computer program instructions may be stored in a non-transitory computer readable medium that can direct a computer, other programmable data processing apparatus, or other devices to function in a particular manner, such that the instructions stored in the computer readable medium produce an article of manufacture including instructions which implement the function/act specified in the flowchart and/or block/schematic diagram.

The term "processor" as used herein is intended to include any processing device, such as, for example, one that includes a central processing unit (CPU) and/or other processing circuitry (e.g., digital signal processor (DSP), microprocessor, etc.). Moreover, a "processor" includes computational hardware and may refer to a multi-core processor that contains multiple processing cores in a computing device. Various elements associated with a processing device may be shared by other processing devices.

The foregoing is illustrative of example embodiments and is not to be construed as limiting thereof. Although a few example embodiments have been described, those skilled in the art will readily appreciate that many modifications to the example embodiments are possible without materially departing from the novel teachings and advantages of the present inventive concept. Accordingly, all such modifications are intended to be included within the scope of the present inventive concept as defined in the appended claims.

What is claimed is:

1. A head mount display (HMD) device comprising:
at least one processor including an image compensator configured to receive image data corresponding to a user's field of view, and motion information including at least one of head rotation speed and translation speed of the user, calculate a control coefficient based on the motion information and the image data, calculate a scaling value that controls a size of a masking area that reduces a range of the user's field of view by masking a peripheral portion of an image corresponding to the control coefficient, and generate compensation image data based on the image data and the scaling value;
a data driver configured to generate a data signal based on the compensation image data;
a scan driver configured to generate a scan signal;
a timing controller configured to generate control signals that control the data driver and the scan driver; and
a display panel configured to display a compensation image corresponding to the compensating image data based on the data signal and the scan signal.

2. The head mount display device of claim 1, wherein the motion information includes both the head rotation speed and the translation speed of the user.

3. The head mount display device of claim 2, wherein the size of the masking area increases as the head rotation speed and the translation speed increases.

4. The head mount display device of claim 3, wherein the size of the masking area is less than a predetermined threshold size.

5. The head mount display device of claim 2, wherein the image compensator includes:
    a first calculator configured to calculate the control coefficient based on the head rotation speed and the translation speed;
    a second calculator configured to calculate the scaling value based on the control coefficient; and
    a compensation image generator configured to generate the compensation image data based on the scaling value.

6. The head mount display device of claim 5, wherein the control coefficient increases as the head rotation speed and the translation speed increase.

7. The head mount display device of claim 5, wherein the scaling value decreases as the control coefficient increases.

8. The head mount display device of claim 5, wherein when the control coefficient is equal to or greater than a predetermined minimum scaling value, the second calculator outputs the minimum scaling value as the scaling value.

9. The head mount display device of claim 1, further comprising:
    a sensing device configured to sense a motion of the user.

10. The head mount display device of claim 1, further comprising:
    a changing amount calculator configured to store the image data frame by frame and calculate the motion information based on a changing amount of the image data between frames.

11. The head mount display device of claim 1, wherein the masking area extends annularly in the peripheral portion of the image.

12. The head mount display device of claim 1, wherein the masking area annularly masks the peripheral portion of the image such that a remaining, central portion of the image has a rectangular shape.

13. The head mount display device of claim 1, wherein the masking area annularly masks the peripheral portion of the image such that a remaining, central portion of the image has a circular shape.

14. A driving method of a head mount display device, comprising:
    generating motion information by sensing a user's motion, the motion information including speed information;
    using at least one processor to:
    receive the motion information and image data corresponding to the user's field of view;
    calculate a control coefficient based on the motion information and the image data;
    calculate a scaling value that controls a size of a masking area that controls a range of the user's field of view by masking a peripheral portion of an image corresponding to the image data based on the control coefficient; and
    generate compensation image data based on the image data and the scaling value.

15. The driving method of claim 14, wherein the motion information includes a head rotation speed of the user and a translation speed of the user.

16. The driving method of claim 14, wherein the size of the masking area increases as the head rotation speed and the translation speed increase.

17. The driving method of claim 14, wherein the size of the masking area is always set less than a predetermined threshold size.

18. The driving method of claim 14, wherein generating the motion information senses the user's motion using a sensing device.

19. The driving method of claim 14, wherein generating the motion information stores the image data frame by frame and the motion information is calculated based on a changing amount of the image data between frames.

20. The driving method of claim 14, wherein the masking area extends annularly in the peripheral portion of the image.

21. A head mount display (HMD) device comprising:
    at least one processor including an image compensator configured to receive image data representing a full size image and to receive motion information including at least one of head rotation speed and a translation speed of a user wearing the HMD device, calculate a control coefficient based on the motion information and the image data, calculate a scaling value that controls a size of a masking area that controls a range of the user's field of view by masking a peripheral portion of the full size image based on the control coefficient, the peripheral portion of the full size image being masked by an amount positively correlated with the at least one of the head rotation speed and the translation speed, and to generate compensation image data based on the image data and the scaling value; and
    a display panel configured to display a compensation image based on the compensation image data.

22. The HMD device of claim 21, further comprising a sensor unit to sense at least one of the head rotation speed and the translation speed,
    wherein the image data represents a computer-generated environment, and the processor causes the image data to change according to the motion information.

* * * * *